J. ERRET.
STAKE RACK IRON.
APPLICATION FILED APR. 26, 1918.
1,331,144.
Patented Feb. 17, 1920.
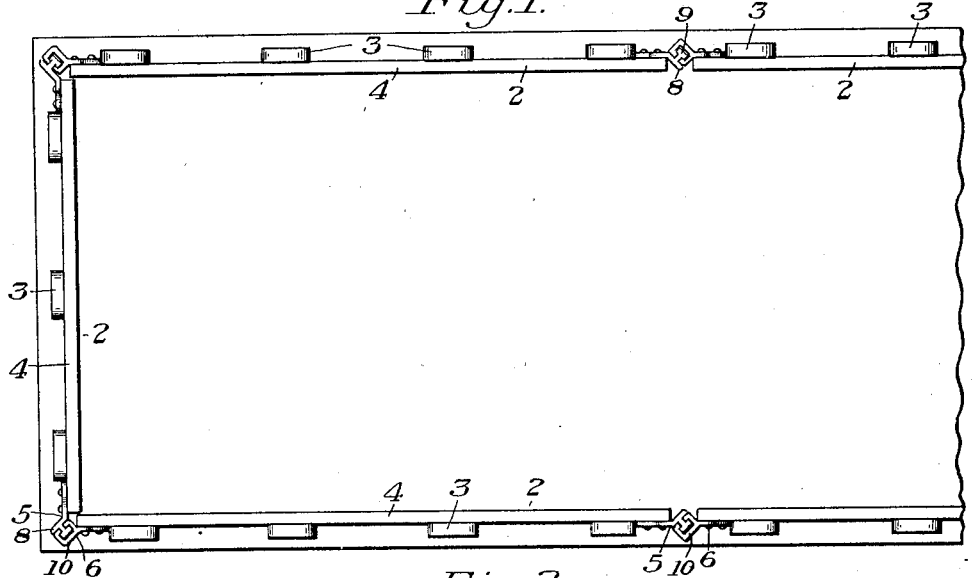
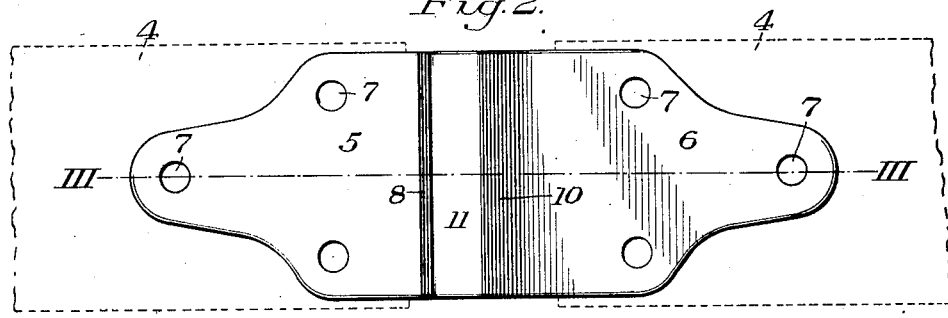
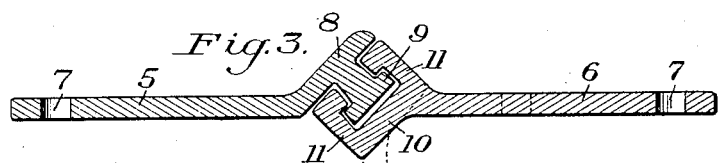
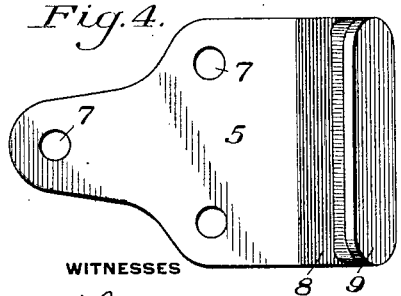
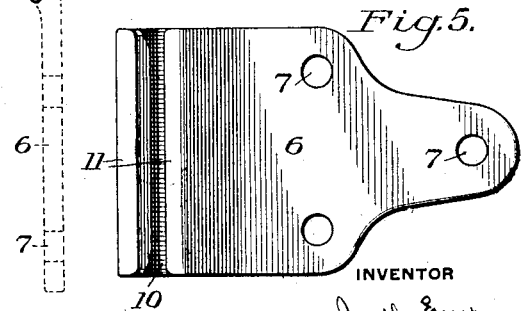
WITNESSES
INVENTOR

UNITED STATES PATENT OFFICE.

JOSEPH ERRET, OF CLEVELAND, OHIO.

STAKE-RACK IRON.

1,331,144.

Specification of Letters Patent.   Patented Feb. 17, 1920.

Application filed April 26, 1918.   Serial No. 230,937.

*To all whom it may concern:*

Be it known that I, JOSEPH ERRET, a citizen of the United States, residing at Cleveland, in the county of Cuyahoga and State of Ohio, have invented a new and useful Improvement in Stake-Rack Irons, of which the following is a full, clear, and exact description, reference being had to the accompanying drawings, forming part of this specification, in which—

Figure 1 is a top plan view showing the invention applied to a stake rack truck body.

Fig. 2 is a face view of one of the irons with the sections engaged with each other.

Fig. 3 is a section on the line III—III of Fig. 2, and

Figs. 4 and 5 are face views of the two iron sections detached.

My invention has relation to stake rack irons which are used to connect the stake rack sections of a stake rack vehicle body.

What is known to the trade as a stake rack truck body usually consists of a plurality of body sections each having two or more vertical stakes connected by two or three horizontal slats which are secured to the stakes. There are two, and sometimes three, of these sections in each side of the truck body, as well as end sections.

Heretofore it has been common to connect these sections, one to another, by means of hooks and eyes and in order to use such hooks and eyes both at the sides and corners, it has been necessary to make them in right and left pairs.

My invention is designed to provide a simple and convenient form of connecting device which can be readily and easily applied; which will securely connect the stake rack sections together; which will obviate the necessity for "rights and lefts;" and which by a simple change in the setting of one of the members enables the device to be used to connect either the side racks or the side and end racks.

Referring to the accompanying drawing in which I have shown a preferred embodiment of my invention, which will now be described, the numeral 2 designates the stake rack sections of a vehicle truck body, each section shown as having a plurality of vertical stakes 3 connected by horizontal slats 4. 5 and 6 designate the two sections of my improved connecting iron. The section 5 comprises a casting of general plate-form, preferably of malleable iron, and provided with a plurality of bolt openings 7. One edge portion of this section has a flange 8 extending at an oblique angle to the body section, and this flange on its inner face is provided with a T-shaped or flanged projection 9. The other section 6 is also a casting of plate-form, having a plurality of holes 7 to receive attaching means and formed at one end with a slide-box opening consisting of a base 10 and overhung side portions 11, these forming an internal recess of the proper form to engage the T-projection 9 of the other section. The base portion 10 is at an oblique angle to the body portion 6, and is substantially parallel to the flange 8 of the section 5.

The operation will be readily understood. When used as a connector for side sections, the two members are engaged with each other in positions clearly shown in full lines in Fig. 3, the body portions of the two members of the stake iron then lying in substantially the same vertical plane. When used at the corners, one of the sections is reversed edge for edge with respect to the other section, as shown in dotted lines in Fig. 3, thereby bringing the body portions of the two members at substantially right angles to each other. In this manner, by a simple change in the setting of one of the members, the device can be readily adapted for use in either location. By reversing the sections edge for edge they can be used at both corners, this obviating the necessity for rights and lefts.

It will be readily seen that when the two sections are in interlocking engagement they form a secure and substantially rigid connection for the stake rack sections; that they can be readily engaged and disengaged; and that any stake rack section can be removed independently of the others.

I do not desire to limit myself to the exact form of my invention which I have herein shown and described, as it will be obvious that the form and arrangement of the interlocking portions of the members may be varied within the scope of the appended claims.

I claim:

1. A stake rack iron comprising two members or sections of strap form, one of said members or sections having a headed projection, and the other of said members having a slide-way for interlocking engagement with said projection, the strap portions of said members having means for their attachment to a stake rack; substantially as described.

2. A stake rack iron formed of two members or sections of strap form, each comprising an attaching portion and an engaging portion, the engaging portion of one member consisting of a flange extending at an angle to the attaching portion and formed on its inner face with a headed projection, and the engaging portion of the other member comprising a slide-box also at an angle to its attaching portion and adapted to receive therein the headed projection of the other member, the strap portions of said members having means for their attachment to a stake rack; substantially as described.

3. A stake rack iron comprising two members or sections of strap form, one of said members or sections having a headed projection, and the other of said members having a slide-way for interlocking engagement with said projection, said sections being reversible edge for edge, the strap portions of said members having means for their attachment to a stake rack; substantially as described.

4. A stake rack iron comprising two members or sections of strap form, one of said members or sections having a flange extending at an oblique angle and formed on its inner face with a T-shaped projection, and the other member or section having a slide-box opening also at an angle to its body portion and adapted to interfit with said projection, the strap portions of said members having means for their attachment to a stake rack; substantially as described.

5. A stake rack iron comprising two members of strap form, said members having interfitting engaging portions at an angle to their body portions, said portions being constructed and arranged to interfit in either of two different positions of one of said members and the strap portions of said members having means whereby they may be attached to a stake rack; substantially as described.

6. A stake rack iron comprising two members of strap form, having means whereby they may be attached to a stake rack, each of said members having an oblique portion at one edge, one of said oblique portions having a T-head, and the other of said members having a T-shaped slot therein, the projections of said head and the overhanging walls of said slot being arranged to mutually bear against each other, substantially as described.

7. A stake rack iron comprising two members of strap form, having means whereby they may be attached to a stake rack, each of said members having an oblique portion at one edge, one of said oblique portions having a T-head, and the other of said members having a T-shaped slot therein, the projections of said head and the overhanging walls of said slot being arranged to mutually bear against each other, and the surface of the oblique portion of the other member adjacent to the base of the T-head being adapted to bear against the outer end surfaces of the slot containing portion of the first named member, substantially as described.

In testimony whereof, I have hereunto set my hand.

JOSEPH ERRET.